United States Patent
Brendle et al.

(10) Patent No.: US 8,261,248 B2
(45) Date of Patent: Sep. 4, 2012

(54) SYSTEM AND METHOD OF EXECUTING A DYNAMIC PROGRAM IN A STRUCTURED ENVIRONMENT

(75) Inventors: Rainer Brendle, Mountain View, CA (US); Murray Spork, San Francisco, CA (US)

(73) Assignee: SAP AG, Walldorf (DE)

(*) Notice: Subject to any disclaimer, the term of this patent is extended or adjusted under 35 U.S.C. 154(b) by 1338 days.

(21) Appl. No.: 11/935,285

(22) Filed: Nov. 5, 2007

(65) Prior Publication Data

US 2009/0119642 A1 May 7, 2009

(51) Int. Cl.
*G06F 9/45* (2006.01)
(52) U.S. Cl. .......................... 717/148; 717/153; 717/165
(58) Field of Classification Search .................. None
See application file for complete search history.

(56) References Cited

U.S. PATENT DOCUMENTS

| 2003/0088604 | A1* | 5/2003 | Kuck et al. ................. 709/1 |
| 2004/0255267 | A1* | 12/2004 | Meijer ........................ 717/106 |
| 2005/0198303 | A1 | 9/2005 | Knauerhase et al. |

OTHER PUBLICATIONS

Wikipedia: "Dynamic Programming Language". Internet citation. Feb. 22, 2007. XP007906961. URL: http://en.wikipedia.org/w/index.php?title=dynamic_programming_language&oldid=109993610.
Helander J. et al: "MMLite: A Highly Componentized System Architecture". ACM SIGOPS European Workshop, XX, XX, vol. 8, Sep. 7, 1998.
European Search Report (from a corresponding foreign application, EP08015634.2, mailed Feb. 6, 2009.
"ABAP", Wikipedia, Oct. 13, 2007, pp. 1-16.
"Ruby", Wikipedia, Oct. 3, 2007, pp. 1-9.
David Ascher, "Dynamic Tools for Dynamic Language", ActiveState, Jul. 27, 2004, pp. 1-14.
Almut Herzog et al, "Problems Running Untrusted Services as Java Threads", CSES 2004 Preproceedings, 2004, pp. 1-8.
Caroline Roth et al, "Force.com Platform", Force.com Cookbook, 2007, pp. 1-10, 30-42.

* cited by examiner

*Primary Examiner* — Chuck Kendall
(74) *Attorney, Agent, or Firm* — Fountainhead Law Group PC

(57) ABSTRACT

In one embodiment the present invention includes a first virtual machine that executes a non-dynamic program, that implements a second virtual machine that executes a dynamic program. The dynamic program operates in the structured environment of the non-dynamic programming language via various allowed interaction pathways. In this manner, dynamic programs may be executed in a robust business applications environment.

20 Claims, 6 Drawing Sheets

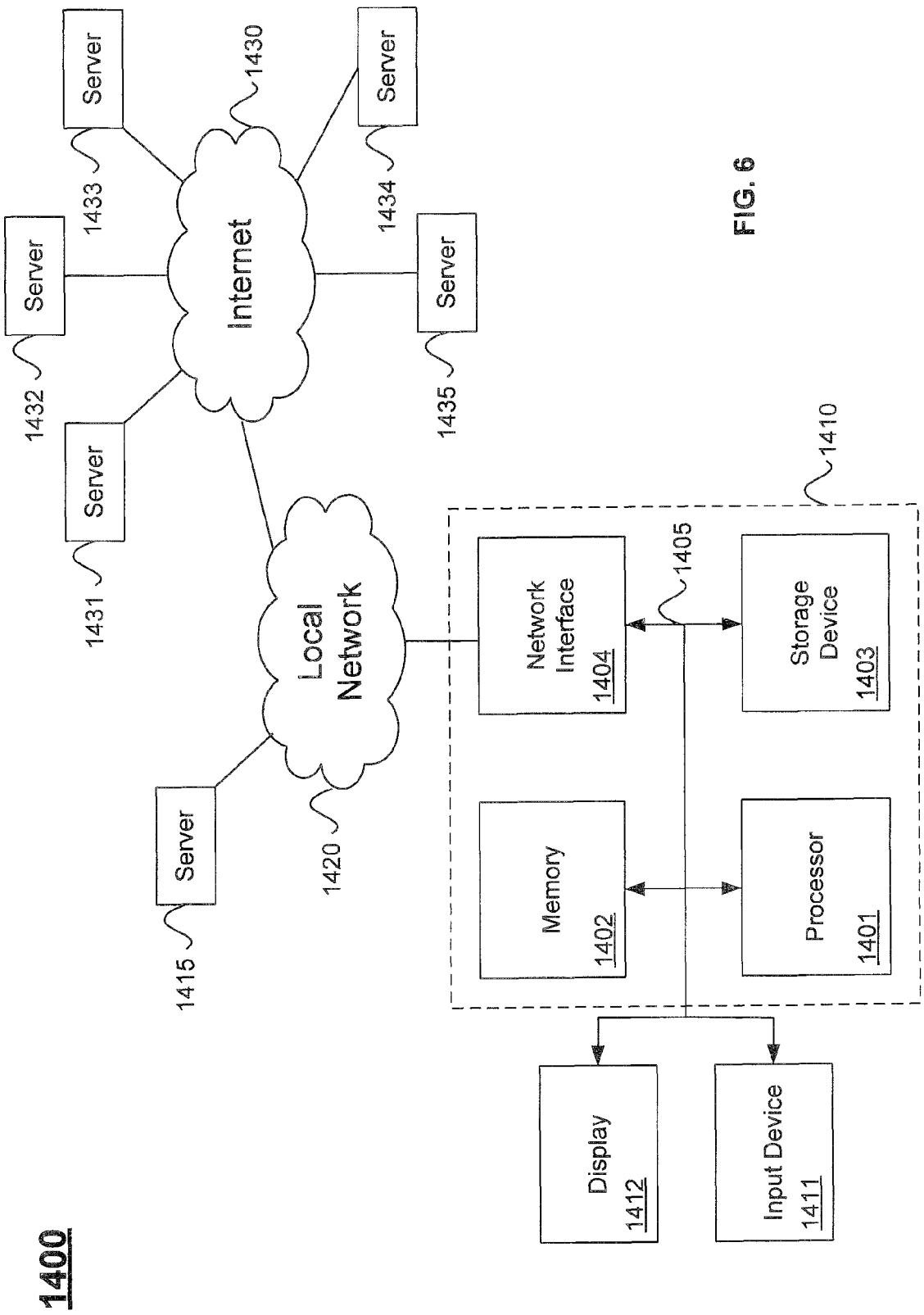

SYSTEM AND METHOD OF EXECUTING A DYNAMIC PROGRAM IN A STRUCTURED ENVIRONMENT

CROSS REFERENCE TO RELATED APPLICATIONS

Not applicable.

BACKGROUND

The present invention relates to dynamic programming languages, and in particular, to executing dynamic programs in a structured environment.

Unless otherwise indicated herein, the approaches described in this section are not prior art to the claims in this application and are not admitted to be prior art by inclusion in this section.

Programming languages may be broadly categorized into two types: dynamic programming languages and non-dynamic programming languages. A non-dynamic language may be thought of as a programming language where the binding between method (or procedure) calls to the implementing methods happens at compile time. A dynamic language may be thought of as a programming language where the binding happens at runtime and usually can be overwritten in the program at any time. In non-dynamic languages, the method calls may be calls to procedures, which are assigned to classes. In dynamic languages, a method call may be a message to be sent to an instance of a class, and it is the task of the class to decide what to do with the message.

More specifically, the term "dynamic programming language" describes a class of high level programming languages that execute at runtime many common behaviors that other languages might perform during compilation, if at all. These behaviors could include extension of the program, by adding new code, by extending objects and definitions, or by modifying the type system, all during program execution. These behaviors can be emulated in nearly any language of sufficient complexity, but dynamic languages provide direct tools to make use of them. The term "non-dynamic programming language" describes languages that lack these behaviors. (Non-dynamic programming languages may also be referred to as "static programming languages".)

Dynamic programming languages have a number of benefits, either actual or perceived. They are flexible, for example, by allowing dynamic typing of variables, and giving the ability to change code and logical structures at runtime. Many dynamic languages are open source languages. Dynamic languages allow for high productivity, for example, being easy to learn and having a straightforward syntax. Dynamic languages often allow for easier integration, for example in environments such as mashups or other web services.

An example of a dynamic language is Ruby. Ruby is a reflective, dynamic, object-oriented programming language. It combines syntax inspired by Perl with Smalltalk-like object-oriented features, and also shares some features with Python, Lisp, Dylan, and CLU. Ruby is a single-pass interpreted language.

However, dynamic languages have a number of drawbacks in certain computing environments. For example, the ability to change the program code during program execution is generally a strength, but is a drawback in the business applications environment. For business applications, it is generally undesirable for the programs of one user to affect the programs or data of another user. Business applications must be generally "robust", where programs from different users are kept isolated, limiting the potential to create damage to other users' programs, to the server, or to the underlying business data.

Such problems are not solved by implementing dynamic languages in the Java® language, for example, because the Java® language has no thread-level isolation. For further details, see for example Almut Herzog and Nahid Shahmehri, "Problems Running Untrusted Services as Java Threads", CSES 2004 2nd International Workshop on Certification and Security in Inter-Organizational E-Services (2004).

Thus, there is a need for improved robustness when executing dynamic programs in a business applications environment. The present invention solves these and other problems by providing systems and methods for executing dynamic programs in a structured environment.

SUMMARY

Embodiments of the present invention improve the robustness and scalability of dynamic programming languages. In one embodiment the present invention includes a computer system including software to execute a dynamic program in a structured environment. The software includes a virtual machine software file and a secured bridges software file. The virtual machine software file implements a first virtual machine to execute a first program. The first program is in a non dynamic programming language. The first virtual machine manages a first stack, and the first program uses the first stack. The secured bridges software file defines allowed interaction pathways between the first program and a second program. The second program is in a dynamic programming language. The first program implements a second virtual machine within the first virtual machine to execute the second program using the allowed interaction pathways. The first program manages a second stack in the second virtual machine, and the second program uses the second stack.

In another embodiment the present invention includes a method to execute a dynamic program in a structured environment.

In another embodiment the present invention includes a computer-readable medium embodying a computer program to execute a dynamic program in a structured environment.

The following detailed description and accompanying drawings provide a better understanding of the nature and advantages of the present invention.

BRIEF DESCRIPTION OF THE DRAWINGS

FIG. 6 is a block diagram of an example computer system and network for implementing embodiments of the present invention.

DETAILED DESCRIPTION

Described herein are techniques for executing a dynamic program in a structured environment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described below are various computer-implemented methods and computer programs. These are referred to by various names, including computer processes, programs, modules, software, and software files. When computer programs as such are discussed, they are embodied on a tangible recording medium.

Described below are various methods. Although a particular method might have method steps described in a particular order, such description is mainly for clarity of presentation. The order may vary and method steps may be performed in parallel, as desired according to various embodiments. When a particular method step is required to precede or follow another, such order will be apparent from the context or specifically noted.

Figure 1:
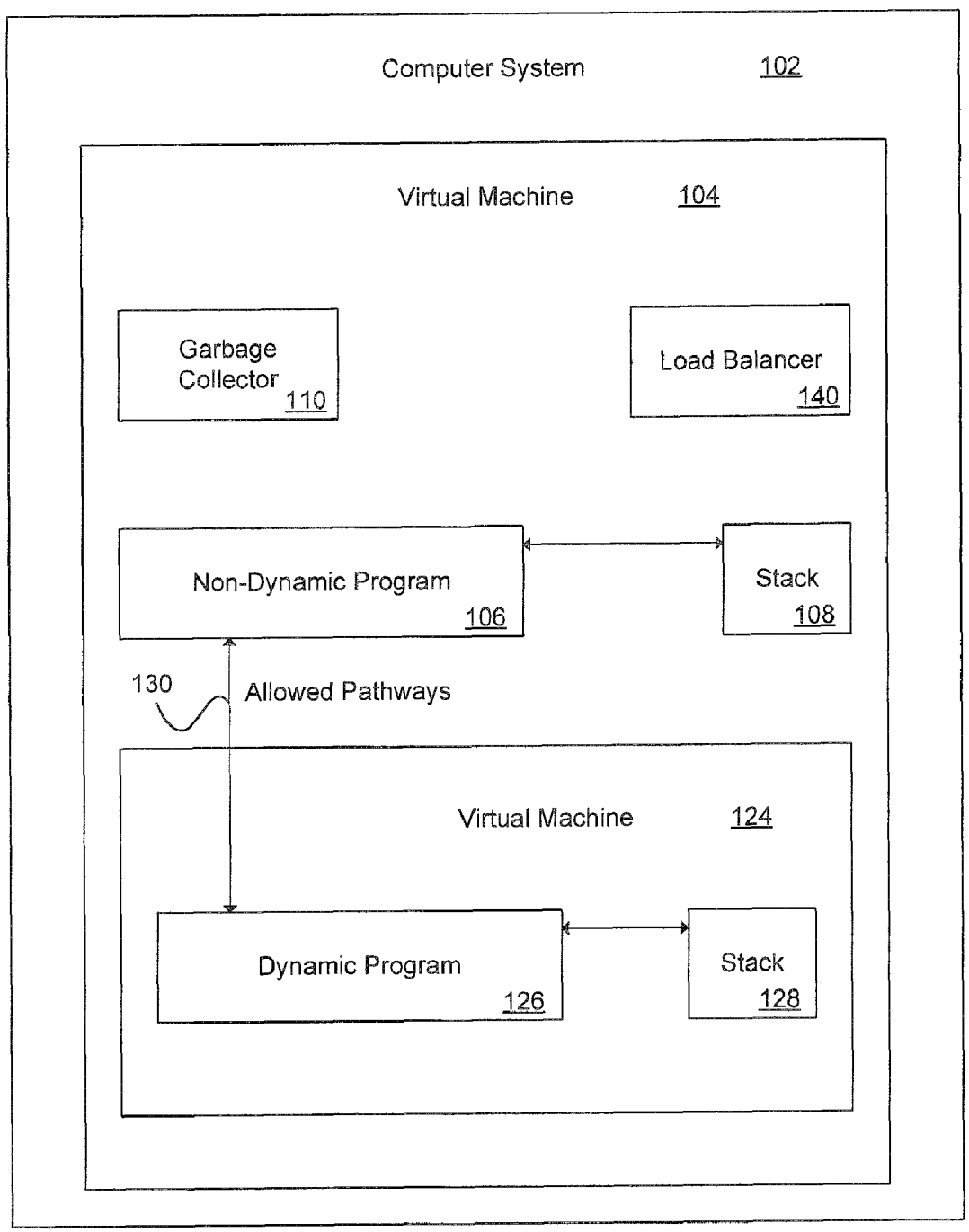
FIG. 1 is a block diagram of a system that executes a dynamic program in a structured environment according to an embodiment of the present invention.

FIG. 1 is a block diagram of a system 100 that executes a dynamic program in a structured environment according to an embodiment of the present invention. The system 100 includes a computer system 102. (Specific implementation details of the computer system 102 are provided in subsequent sections.) The computer system 102 executes a computer program that implements a virtual machine 104.

The virtual machine 104 implements a non-dynamic programming environment. Within the non-dynamic programming environment, computer programs written in the corresponding non-dynamic programming language may be executed. The non-dynamic program 106 is shown as an example. The non-dynamic programming language may be an object-oriented language, in which case the non-dynamic program 106 may define objects on which the virtual machine 104 operates.

The non-dynamic program 106 interfaces with a stack 108. The stack 108 operates as a call stack for the non-dynamic program 106, where parameters are passed to methods, which again may have local variables and may call other methods (or the method may recursively call itself).

The virtual machine 104 may include other components, such as a garbage collector 110. The garbage collector 110 reclaims memory in the computer system 102 allocated to the objects created by the non-dynamic program 106 once these objects are no longer needed.

The non-dynamic program 106 generally implements and controls a structured environment for executing computer programs. As part of this structured environment, the non-dynamic program 106 implements a virtual machine 124 to execute a dynamic program 126.

The virtual machine 124 implements a dynamic programming environment. Within the dynamic programming environment, computer programs written in the dynamic programming language may be executed. The dynamic program 126 is shown as an example. The dynamic programming language may be an object-oriented language, in which case the dynamic program 126 may define objects on which the virtual machine 124 operates.

The dynamic program 126 interfaces with a stack 128. The stack 128 operates as a call stack for the dynamic program 126, where parameters are passed to methods, which again may have local variables and may call other methods (or the method may recursively call itself).

The dynamic program 126 is isolated within the virtual machine 124 and interacts with the non-dynamic program 106 over a variety of allowed interaction pathways 130. These interaction pathways 130 are more fully described below. In this manner, the dynamic program 126 is isolated from the computer system 102 as well as from other dynamic programs that may belong to other users.

The stacks 108 and 128 are not identical for different languages, since there are differences on how parameters are passed in different languages. The finding here for us was that you can combine the two languages, since every method either belongs to the one or the other language and you will need to assign different stack frames, i.e. a data structure on the call stack, which represents a method call, for the different languages. According to one embodiment of the present invention, the dynamic language stack frame 128 is just an extension of the stack frame structure 108 of the non-dynamic language.

The load balancer 140 performs load balancing of the virtual machine 104 among the components of the computer system 102. As discussed more fully with reference to FIGS. 2-3 and 6, the components of the virtual machine 104 may be spread across multiple physical devices; the load balancer 140 manages this spreading.

As an example of a specific implementation of an embodiment of the present invention, the non-dynamic programming environment of the ABAP™ programming language may provide a robust environment for executing dynamic programs written in Ruby. The ABAP™ language is a high level programming language created by SAP AG. It is currently positioned, alongside the more recently introduced Java, as the language for programming SAP's Web Application Server product, part of SAP's NetWeaver™ platform for building business applications.

Figure 2:
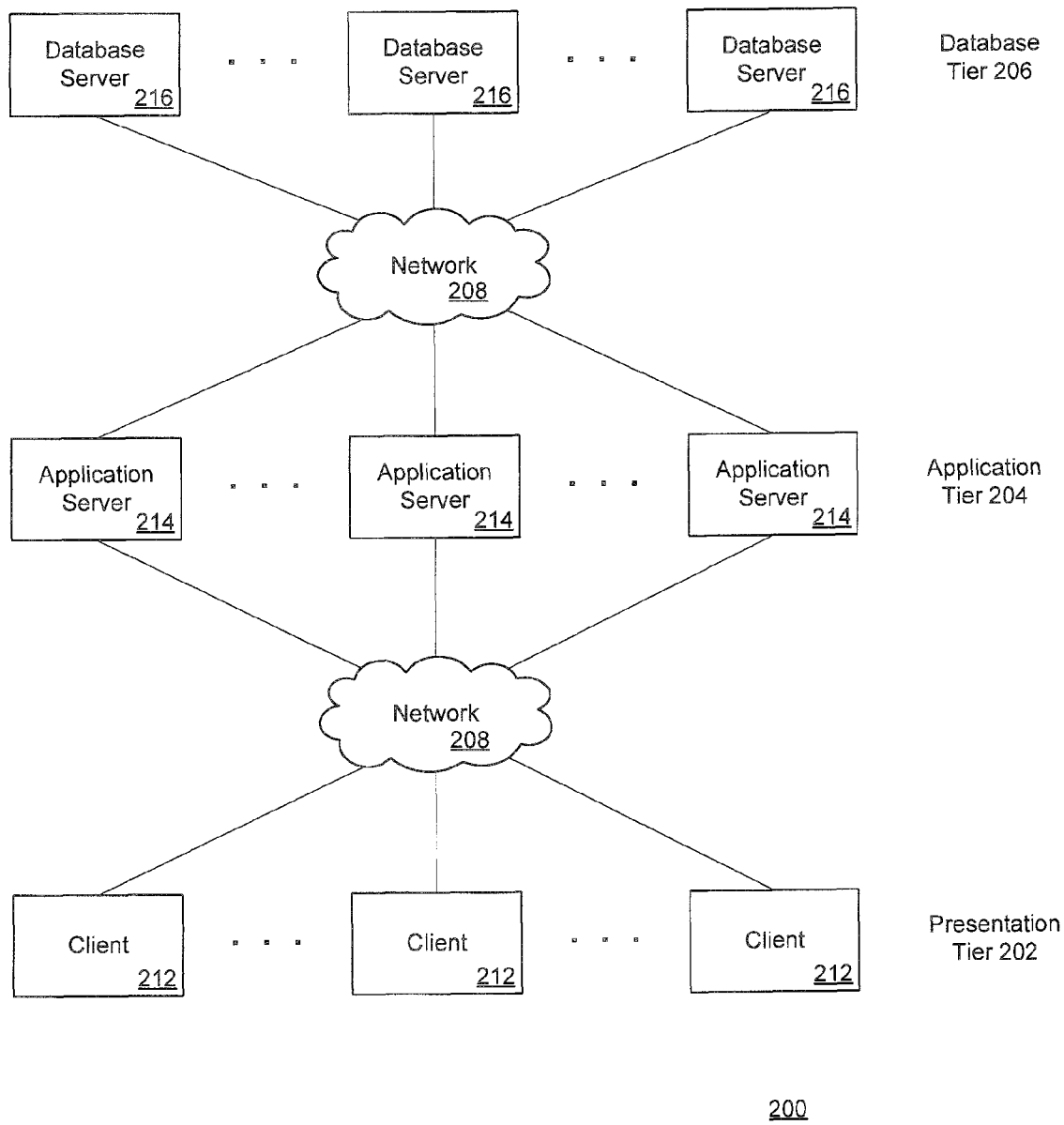
FIG. 2 is a block diagram of a three-tier architecture system that may be used to implement the computer system according to an embodiment of the present invention.

FIG. 2 is a block diagram of a three-tier architecture system 200 that may be used to implement the computer system 102. The system 200 includes a presentation tier 202, an application tier 204, and a database tier 206. A network 208 connects the devices within and between the tiers.

The presentation tier 202 generally includes one or more client computers 212. The client computers 212 generally provide a graphical user interface for users to interact with the other parts of the system 200.

The application tier 204 generally includes one or more application servers 214. The application servers 214 generally implement the business logic for processing interactions between the users and the underlying data. Various of the application servers 214 may perform different functions. For example, one of the application servers 214 may be used for prototyping or development, while the others may be used for business intelligence production activities. In general, the virtual machine 104 (see FIG. 1) resides on one or more of the application servers 214 in the application tier 204.

The database tier 206 generally includes one or more database servers 216. The database servers 216 generally implement a database management system that stores and manipulates the underlying data and related metadata Although many separate devices are shown in each tier, such is mainly for illustration purposes to show scalability. For example, a single database server may be used in the basic configuration, but as the amount of data in the databases increases, the number of database servers 216 may be increased. As another example, a single application server may be used in the basic configuration, but as the amount of business logic processes increases, the number of application servers 214 may be increased. The load balancer 140 (see FIG. 1) performs load balancing by distributing the virtual machine 104 over the application servers 214 in the application tier, as well as coordinating interaction with the database servers 216 in the database tier. In this manner, the load balancer 140 (see FIG. 1) enables scalability of the dynamic programming environment (for example, the virtual machine 124) within the structured programming environment (for example, the virtual machine 104).

The system 200 may be implemented in a variety of operating systems, for example, UNIX (AIX, HP-UX, Solaris, Linux), Microsoft Windows, IBM Series i (former iSeries, AS/400) and IBM zSeries (former S/390). Various types of database systems may be used, including DB2, Informix, MaxDB, Oracle and Microsoft SQL Server. The SAP Web Application Server is a specific example of an implementation of the system 200.

Returning to FIG. 1, according to a specific example implementation of an embodiment of the present invention, the SAP Web Application Server may be used to implement the computer system 102 (or the system 200, see FIG. 2). In such a case, the non-dynamic programming language is the ABAP™ language. The SAP Web Application Server may implement the virtual machine 104 as part of the ABAP™ runtime environment. The non-dynamic program 106 includes components for executing dynamic programs in ABAP (as more fully discussed in subsequent sections). As a further specific example implementation, Ruby may be used as the dynamic programming language.

Figure 3:
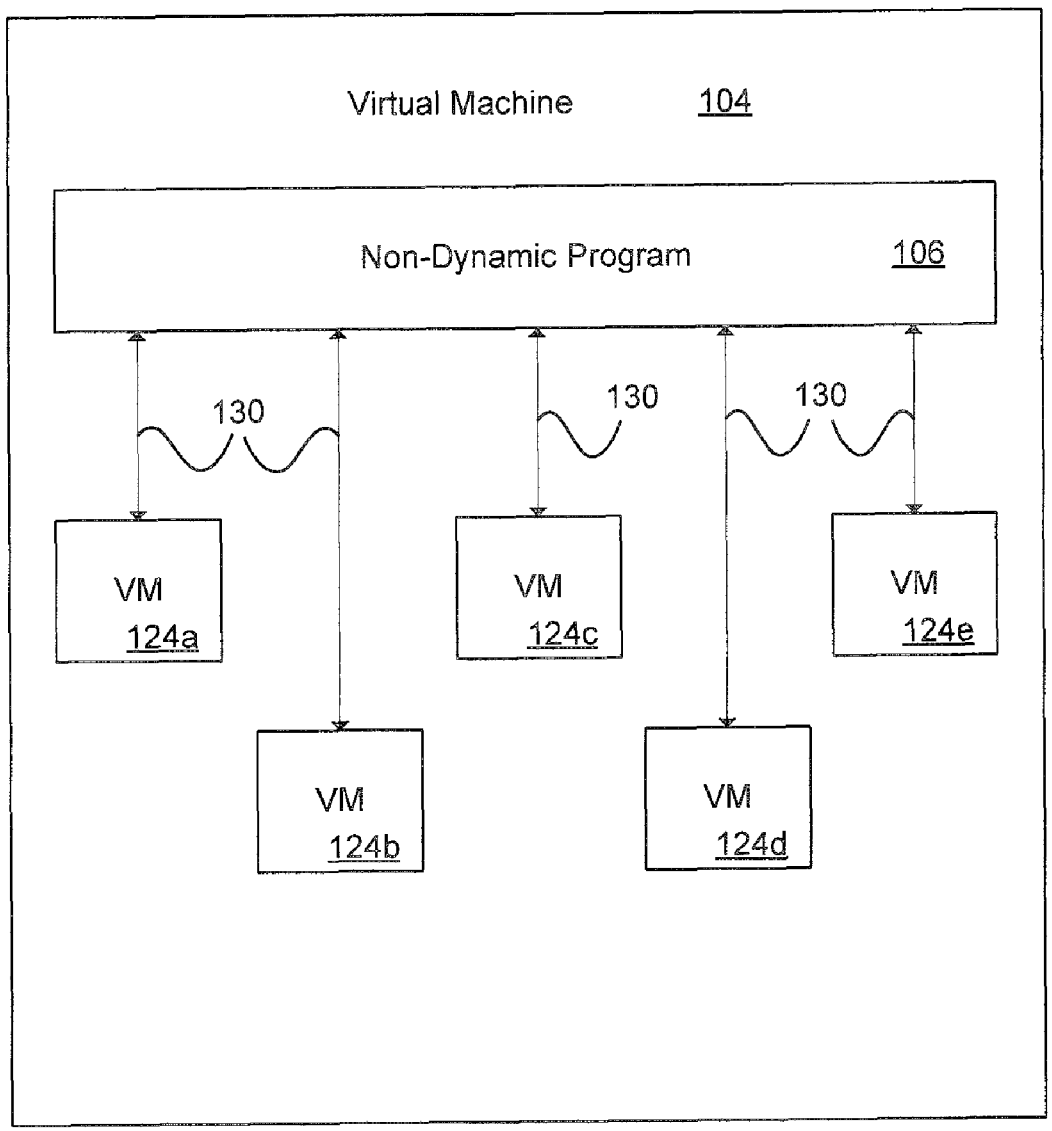
FIG. 3 is a block diagram showing multiple virtual machines according to an embodiment of the present invention.

FIG. 3 is a block diagram showing multiple virtual machines according to an embodiment of the present invention. The virtual machine 104 (see FIG. 1) executes the non-dynamic program 106 (see FIG. 1), which may implement numerous virtual machines 124a, 124b, 124c, 124d and 124e (collectively "virtual machines 124"; see also FIG. 1). The interactions of the virtual machines 124 are via the allowed pathways 130 (see also FIG. 1). The virtual machine 124a (for example) is isolated from each other virtual machine 124b, 124c, 124d and 124e. The dynamic programs in the virtual machines 124 are also isolated from each other. The dynamic programs of one user cannot affect the dynamic programs of another user.

Figure 4:
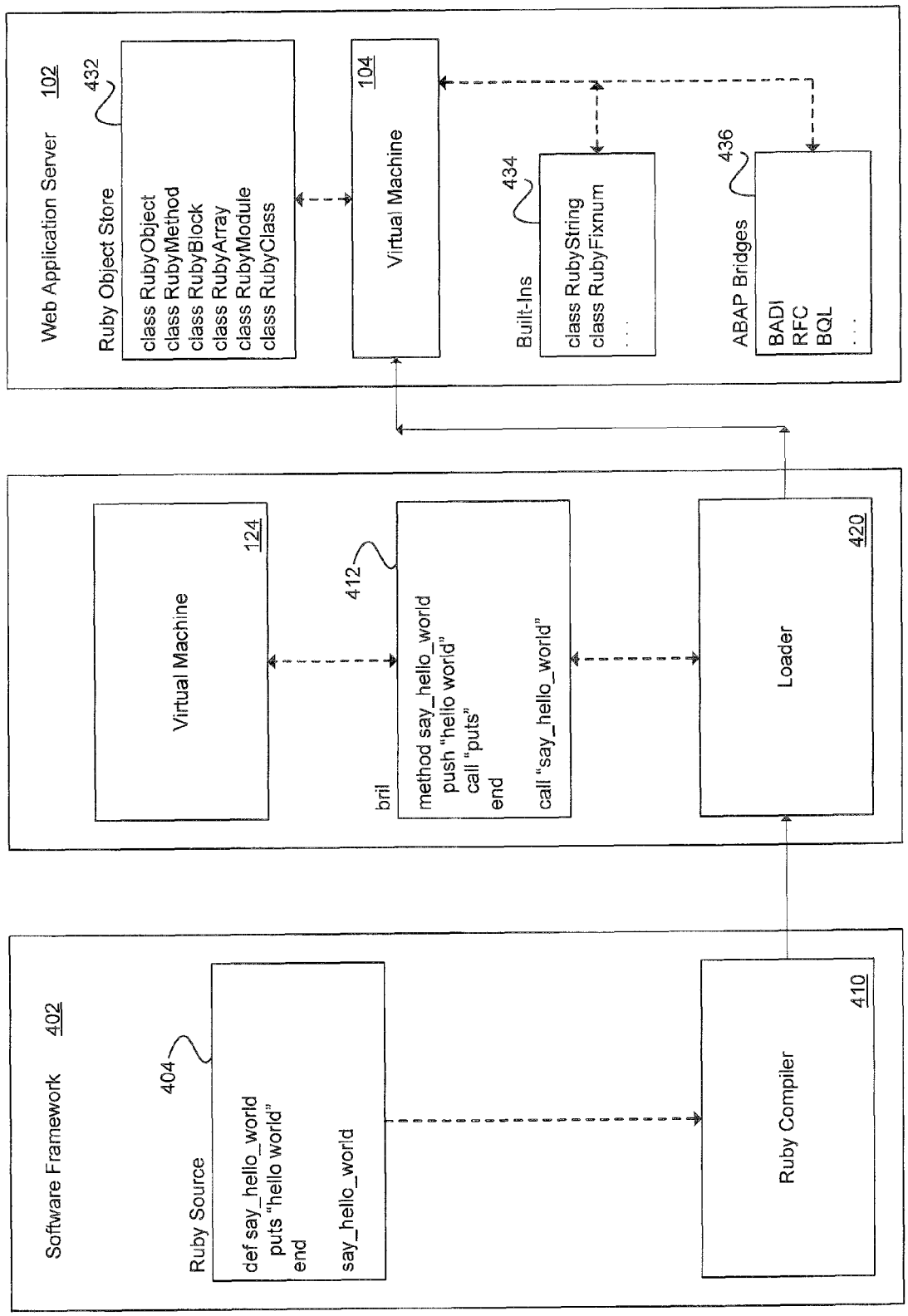
FIG. 4 is a block diagram of various components of the non-dynamic program and related programs according to an embodiment of the present invention.

FIG. 4 is a block diagram of various components of the non-dynamic program 106 and related programs. For conciseness, specific references to Eclipse, Ruby and ABAP™ are made. However, it is to be understood that similar concepts may be applied when using other modeling frameworks, dynamic languages, and non-dynamic languages.

A user may interact with a software framework 402 (such as Eclipse) to develop Ruby programs. The software framework 402 generally provides a user interface for programming. The software framework 402 may provide a standard source control system. The software framework 402 may include a debugger. The software framework 402 interacts with a compiler 410.

As an example, the Ruby program 404 is shown. The command "puts" is the basic command to print something out in Ruby, so purpose of the Ruby program 404 is to output the phrase "hello world".

The compiler 410 compiles the Ruby program 404 into an intermediate program 412. According to an embodiment of the present invention, the language of the intermediate program 412 is termed the Blue Ruby Intermediate Language. The compiler 410 may be written in the Java® language. The compiler 410 interacts with the virtual machine 124.

The virtual machine 124 generally is described above regarding FIG. 1. More specifically, the Blue Ruby virtual machine 124 is a stack/register virtual machine that executes the intermediate program 412. The parameters of the virtual machine 124 may be changed as desired, in which case corresponding adjustments may be made to the compiler 410 so that the intermediate program 412 runs on the changed virtual machine 124.

In general, a language virtual machine (VM) is an engine which operates instructions one after the other. According to certain embodiments of the present invention, VMs for different languages can be seen to be additive, since a VM just consists of a unstructured set of instructions to be operated. You can add instructions needed for the second language to an existing VM without interferences. These new instructions can either be implemented natively as the instructions for the first language usually have been implemented or as a combination of more atomic base operations, which already existed for the first language (in hardware processor design the second is sometimes called micro code).

The dynamic language for example may have an instruction to dynamically call a method by sending a message to an object instance—an instruction, which the non-dynamic language didn't need and doesn't have.

As an example, the intermediate program 412 is shown. Since the virtual machine 124 is a stack machine, the command "push" is used to push the phrase "hello world" onto the stack. The command "call" is used to call the function "puts".

The loader 420 interfaces between the software framework 402, the virtual machine 124, and the virtual machine 104. The loader may be a component of the non-dynamic program 106 (see FIG. 1).

The non-dynamic program 106 (see FIG. 1) interfaces with a number of modules that are used for performing various functions related to managing the virtual machine 124 and running the intermediate program 412. The specifics of these modules depend upon the specifics of the particular dynamic language and the particular non-dynamic language implemented. For the embodiment of FIG. 4, which uses Ruby and ABAP, these modules are written in ABAP. These modules are part of the virtual machine 104 and include an object store and runtime library module 432, a built-in operations module 434, and a secured bridges module 436.

The object store and runtime library module 432 maps objects in the dynamic language to objects in the non-dynamic language. In general, the object store and runtime library module 432 manages the basic class hierarchy and handles the relations between classes, methods and object instances. The object store and runtime library module 432 may also manage the lifetimes of objects, which may involve interacting with the garbage collector 110 (see FIG. 1). As an example, Ruby has objects, methods, blocks, arrays, modules, and classes. ABAP has classes. The object store and runtime library module 432, in the embodiment of FIG. 4, maps these Ruby objects to a variety of ABAP classes (objects). For example, the Ruby object "object" is mapped to the ABAP class "RubyObject".

Usually data types are organized as a type hierarchy in a programming languages. Two languages have two different type hierarchies, i.e. two independent trees. However, according to certain embodiments of the present invention, the tree of the second language can be put into the tree of the first language as a subtree just derived from the object root of the first language. The object root of the second language then may implement the dynamic method invocation capability for the second language, so that all objects of the dynamic language, which then derive from there, can receive dynamic method calls. Since the dynamic language does not know how to call methods of the first language, the methods of the first language's object root are not directly available to the dynamic language, so the language semantics are not broken. On the other side, since every object derived from the first language's object root are managed by the garbage collector of the first language, both languages share a common garbage collector, memory management and physical data representation.

The built-in operations module 434 implements functions or operations in the dynamic language into functions or operations (objects) in the non-dynamic language. For example, Ruby has a "string" function and a "fixnum" function. The built-in operations module 434, in the embodiment of FIG. 4, implements these Ruby functions as ABAP classes (objects). For example, the Ruby function "string" is implemented as an ABAP class "RubyString". The class Ruby String includes ABAP commands that result in the performance of the same function as the Ruby function "string" in the ABAP environment.

The secured bridges module 436 defines the allowed interaction pathways 130 (see FIG. 1). These interaction pathways help guarantee that the dynamic program remains robust in the non-dynamic programming environment. For example, ABAP includes the commands BADI, RFC and BQL. Ruby programs are allowed to call these commands in order to perform these specifically allowed ABAP functions.

Although the allowed interaction pathways 130 are most closely associated with the secured bridges module 436, they may also be viewed as the specific mappings and implementations of the dynamic language objects as non-dynamic language objects. That is, the object store and runtime library module 432 further defines the allowed interaction pathways 130 according to its object mappings from Ruby to ABAP. The built-in operations module 434 further defines the allowed interaction pathways 130 according to its object mappings from Ruby to ABAP.

These allowed interaction pathways 130 help certain embodiments of the present invention to manage a robust, structured environment for executing dynamic programs. The virtual machine 104 implements thread-level isolation among the processes of different users. Thus, the dynamic programs of one user cannot affect the underlying data or the programs of other users, except as allowed by the allowed interaction pathways 130.

Figure 5:
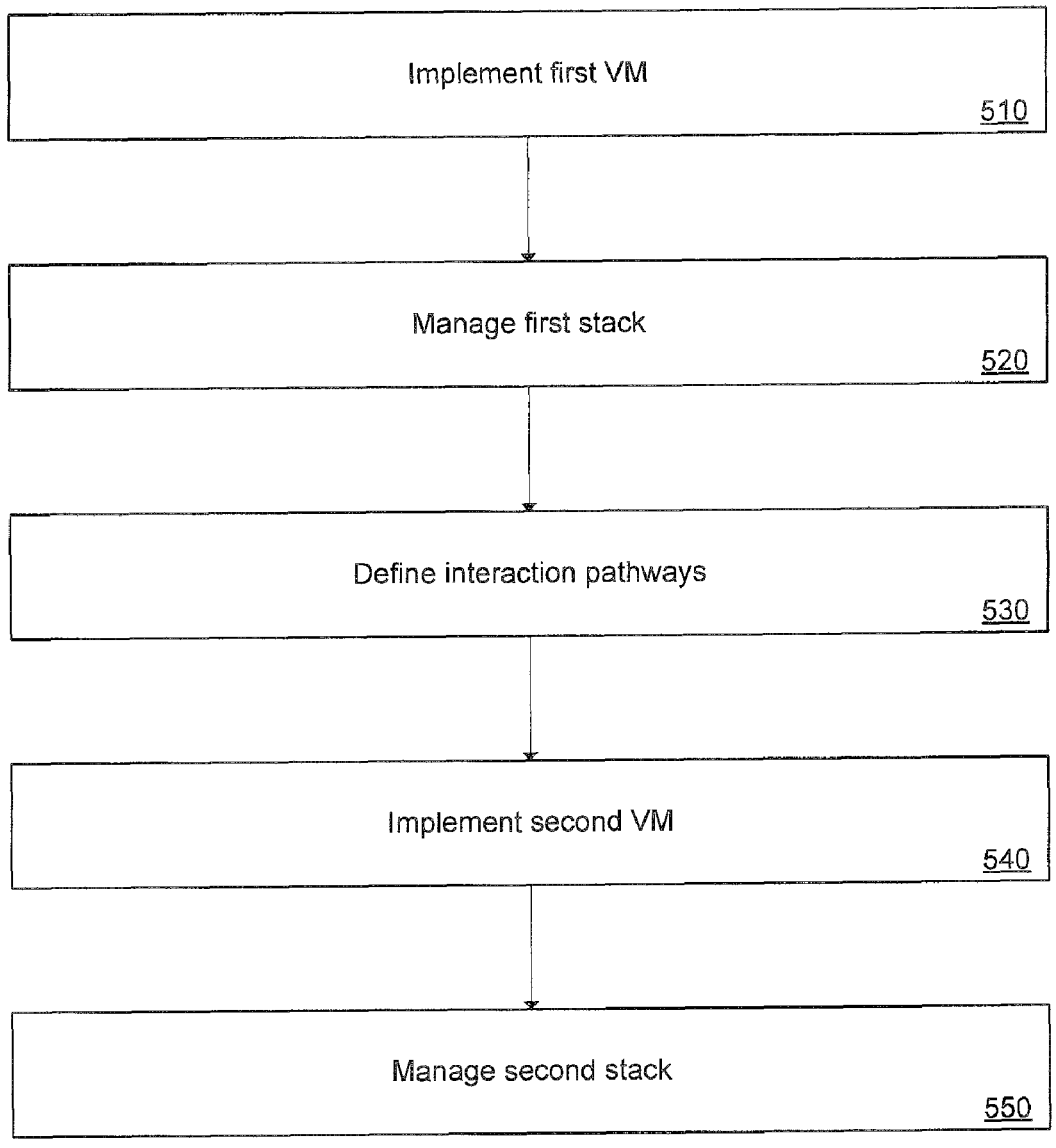
FIG. 5 is a flowchart of a method according to an embodiment of the present invention.

FIG. 5 is a flowchart of a method 500 according to an embodiment of the present invention. The method 500 executes a dynamic program in a structured environment. The method 500 may be implemented on a computer system, for example, the computer system 102 (see FIG. 1) or the system 200 (see FIG. 2).

In step 510, a first virtual machine is implemented to execute a first program. The first program is in a non-dynamic programming language. For example, the computer system 102 may implement the virtual machine 104 to implement the non-dynamic program 106 (see FIG. 1). The non-dynamic programming language may be ABAP.

In step 520, a first stack is managed in the first virtual machine. The first program uses the first stack. For example, the virtual machine 104 may manage the stack 108 (see FIG. 1). The non-dynamic program 108 uses the stack 108 (see FIG. 1).

In step 530, allowed interaction pathways are defined between the first program and a second program. The second program is in a dynamic programming language. For example, the secured bridges module 436 (see FIG. 4) defines at least some of the allowed interaction pathways 130 (see FIG. 1).

In step 540, the first program implements a second virtual machine to execute the second program within the first virtual machine using the allowed interaction pathways. For example, the non-dynamic program 106 implements the virtual machine 124 (see FIG. 1). The virtual machine 124 executes the dynamic program 126 within the virtual machine 104 using the allowed interaction pathways (see FIG. 1).

In step 550, the first program manages a second stack in the second virtual machine. The second program uses the second stack. For example, the non-dynamic program 106 manages the stack 128 in the virtual machine 124 (see FIG. 1).

FIG. 6 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above, including the functions of the presentation layer 202 (see FIG. 2), for example. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. The virtual machine 104 (see FIG. 1) may be implemented on one or more servers, for example. A server 1431 may transmit actions or messages from one component, through Internet 1430, local network 1420, and network interface 1404 to a component on computer system 1410. In general, the servers 1415 or 1431-1435 may be used to implement the application tier 204 and the database tier 206 (see FIG. 2). In such a case, the load balancer 140 (see FIG. 1) manages load balancing among the servers 1415 or 1431-1435.

Regarding certain embodiments of the present invention, one feature is the structured environment in which the dynamic programs may be executed. Aspects of embodiments of the present invention that, alone or in combination, contribute to the structured environment include the non-dynamic programming environment, the allowed interaction pathways, the virtual machine that implements the non-dynamic programming environment, the object store and runtime library, and the operations library.

Regarding certain embodiments of the present invention, another feature is thread-level isolation. Thread-level isolation contributes to the robust, structured environment by constraining the dynamic programs except as allowed by the allowed interaction pathways.

As discussed above, the Java® language lacks thread-level isolation. Thus, a Java® language implementation would not result in a robust, structured environment for executing Ruby programs. Furthermore, a way to add thread-level isolation to Java® is not currently known.

One advantage of certain embodiments of the present invention is that they provide a client-side integrated development environment. The structured business applications environment ensures robust access to the underlying business data, and users are free to test and develop dynamic programs that access the underlying business data without fear of disruption.

Another advantage of certain embodiments of the present invention is that they provide for smooth life cycle management of software. For example, a user can perform rapid testing and development using dynamic programs using the actual underlying business data on the same system as the production system. Then when the dynamic program has been sufficiently tested, it can be released as part of a standard release on the production system without having to perform code porting or other procedures.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer system including software to execute a dynamic program in a structured environment, the software comprising processor;
    a virtual machine software file that implements a first virtual machine to execute a first program, wherein the first program is in a non-dynamic programming language, wherein the first virtual machine manages a first stack, and wherein the first program uses the first stack; and
    a secured bridges software file that defines a plurality of allowed interaction pathways between the first program and a second program, wherein the second program is in a dynamic programming language, wherein the first program implements a second virtual machine within the first virtual machine to execute the second program using the plurality of allowed interaction pathways, wherein the first program manages a second stack in the second virtual machine, and wherein the second program uses the second stack.

2. The computer system of claim 1, wherein the software further comprises:
    an object store and runtime library software file that manages a plurality of objects, wherein the plurality of objects are related to the second program, wherein the first program uses the object store and runtime library software file to execute the second program within the second virtual machine within the first virtual machine.

3. The computer system of claim 1, wherein the software further comprises:
    an object store and runtime library software file that maps a first plurality of objects in the dynamic programming language to a second plurality of objects in the non-dynamic programming language, wherein the second virtual machine executes the second program within the first virtual machine using the second plurality of objects.

4. The computer system of claim 1, wherein the software further comprises:
    an operations library software file that implements a plurality of operations related to the second program, wherein the first program uses the operations library software file to execute a first operation in the dynamic programming language as a second operation in the non-dynamic programming language using the second virtual machine within the first virtual machine.

5. The computer system of claim 1, wherein the software further comprises:
    a compiler software file that compiles the second program into a compiled second program, wherein the first program executes the compiled second program using the second virtual machine within the first virtual machine.

6. The computer system of claim 1, wherein:
    the second virtual machine is one of a plurality of second virtual machines;
    the second program is one of a plurality of second programs in the dynamic programming language;
    the second stack is one of a plurality of second stacks;
    the first program manages each of the plurality of second stacks in a corresponding one of the plurality of second virtual machines;
    the plurality of second programs each use a corresponding one of the plurality of second stacks; and
    the first program implements the plurality of second virtual machines within the first virtual machine to execute the plurality of second programs using the plurality of allowed interaction pathways such that each one of the plurality of second programs is isolated from each other one of the plurality of second programs.

7. The computer system of claim 1, wherein:
    the secured bridges software file defines the plurality of allowed interaction pathways between the first program and a third program, wherein the third program is in the dynamic programming language; and
    the first program implements a third virtual machine within the first virtual machine to execute the third program using the plurality of allowed interaction pathways such that the third program is isolated from the second program, wherein the first program manages a third stack in the third virtual machine, and wherein the third program uses the third stack.

8. The computer system of claim 1, wherein the second program is one of a plurality of second programs in the dynamic programming language, further comprising:
- a plurality of application servers connected to a plurality of client devices and to a plurality of database servers via a network, wherein scalability of executing the plurality of second programs is provided by increasing the plurality of application servers.

9. The computer system of claim 1, wherein the second virtual machine executes the second program by translating an instruction from the dynamic programming language to the non-dynamic programming language.

10. The computer system of claim 1, wherein the first program defines a first plurality of objects, wherein the second program defines a second plurality of objects, wherein the first virtual machine operates on the first plurality of objects, wherein the second virtual machine operates on the second plurality of objects, wherein the software further comprises:
- a garbage collector software file that reclaims memory in the computer system allocated to the first plurality of objects and the second plurality of objects once the first plurality of objects and the second plurality of objects are no longer needed.

11. The computer system of claim 1, wherein the second program is one of a plurality of second programs in the dynamic programming language, further comprising:
- a plurality of application servers connected to a plurality of client devices and to a plurality of database servers via a network; and
- a load balancer software file that performs load balancing of the first virtual machine and the plurality of second programs on the plurality of application servers.

12. A computer-implemented method of executing a dynamic program in a structured environment, comprising the steps of:
- implementing a first virtual machine to execute a first program, wherein the first program is in a non-dynamic programming language;
- managing a first stack in the first virtual machine, wherein the first program uses the first stack;
- defining a plurality of allowed interaction pathways between the first program and a second program, wherein the second program is in a dynamic programming language;
- implementing, using the first program, a second virtual machine to execute the second program within the first virtual machine using the plurality of allowed interaction pathways; and
- managing, using the first program, a second stack in the second virtual machine, wherein the second program uses the second stack.

13. The method of claim 12, further comprising:
- mapping a first plurality of objects in the dynamic programming language to a second plurality of objects in the non-dynamic programming language, wherein the second virtual machine executes the second program within the first virtual machine using the second plurality of objects.

14. The method of claim 12, further comprising:
- implementing a plurality of operations related to the second program, wherein the first program uses the plurality of operations to execute a first operation in the dynamic programming language as a second operation in the non-dynamic programming language using the second virtual machine within the first virtual machine.

15. The method of claim 12, further comprising:
- compiling the second program into a compiled second program, wherein the first program executes the compiled second program using the second virtual machine within the first virtual machine.

16. The method of claim 12, further comprising:
- defining the plurality of allowed interaction pathways between the first program and a third program, wherein the third program is in the dynamic programming language; and
- implementing, using the first program, a third virtual machine within the first virtual machine to execute the third program using the plurality of allowed interaction pathways such that the third program is isolated from the second program, wherein the first program manages a third stack in the third virtual machine, and wherein the third program uses the third stack.

17. The method of claim 12, further comprising:
- translating an instruction from the dynamic programming language to the non-dynamic programming language, for the second virtual machine to execute the second program.

18. The method of claim 12, wherein the second program is one of a plurality of second programs in the dynamic programming language, and wherein a plurality of application servers connect to a plurality of client devices and to a plurality of database servers via a network, further comprising:
- performing load balancing of the first virtual machine and the plurality of second programs on the plurality of application servers.

19. A computer-readable storage medium having recorded thereon software to execute a dynamic program in a structured environment, the software comprising:
- a virtual machine software file that implements a first virtual machine to execute a first program, wherein the first program is in a non-dynamic programming language, wherein the first virtual machine manages a first stack, and wherein the first program uses the first stack; and
- a secured bridges software file that defines a plurality of allowed interaction pathways between the first program and a second program, wherein the second program is in a dynamic programming language,
- wherein the first program implements a second virtual machine within the first virtual machine to execute the second program using the plurality of allowed interaction pathways, wherein the first program manages a second stack in the second virtual machine, and wherein the second program uses the second stack.

20. The computer-readable medium of claim 19, wherein the second program is one of a plurality of second programs in the dynamic programming language, and wherein a plurality of application servers connect to a plurality of client devices and to a plurality of database servers via a network, further comprising:
- a load balancer software file that performs load balancing of the first virtual machine and the plurality of second programs on the plurality of application servers.

* * * * *